United States Patent [19]

Sankey

[11] Patent Number: 4,684,854
[45] Date of Patent: Aug. 4, 1987

[54] METHOD AND APPARATUS FOR ADDING ADDITIONAL D.C. MOTORS AND CONTROL THEREOF

[75] Inventor: Edwin W. Sankey, Marion, Ohio

[73] Assignee: Dresser Industries, Inc., Dallas, Tex.

[21] Appl. No.: 874,941

[22] Filed: Jun. 16, 1986

[51] Int. Cl.[4] .......................... H02J 4/00; H02P 9/00
[52] U.S. Cl. ...................................... 318/140; 307/69;
307/84; 307/86; 322/14
[58] Field of Search ................ 318/140, 345 C, 345 G,
318/149; 37/211, 221, 246, 261, 116; 414/625;
254/290, 292, 293, 302, 316, 339, 340, 362;
322/7, 8, 16, 14; 307/16, 71, 43, 76, 44, 84, 47,
86, 69, 52

[56] References Cited

U.S. PATENT DOCUMENTS

| | | | |
|---|---|---|---|
| 565,138 | 4/1896 | Gale | 307/69 X |
| 2,003,688 | 6/1935 | Hathaway | 307/16 X |
| 2,567,427 | 9/1951 | Fox | 254/340 X |
| 2,636,132 | 4/1953 | Stineman et al. | 307/84 X |
| 2,809,336 | 10/1957 | Allbert | 307/84 X |
| 2,872,591 | 2/1959 | Stineman | 307/84 X |
| 3,460,278 | 8/1969 | Pesavento et al. | 37/116 |
| 3,730,573 | 1/1973 | Vance | 307/84 X |
| 3,894,244 | 7/1975 | Hill | 307/16 |
| 4,136,286 | 1/1979 | O'Halloran et al. | 307/47 X |
| 4,284,265 | 8/1981 | Morrow, Sr. | 254/317 |

FOREIGN PATENT DOCUMENTS

| | | | |
|---|---|---|---|
| 0815546 | 6/1959 | United Kingdom | 307/84 |
| 0614491 | 7/1978 | U.S.S.R. | 318/140 |
| 0760294 | 9/1980 | U.S.S.R. | 307/84 |

Primary Examiner—William M. Shoop, Jr.
Assistant Examiner—Bentsu Ro

[57] ABSTRACT

A control system for a material handling device such as a drag line in which additional power required for a first motion, such as hoisting, may be obtained from the power source for a second motion such as drag and conversely additional power for the second motion may be obtained from the power available for the first motion under specified conditions.

18 Claims, 5 Drawing Figures

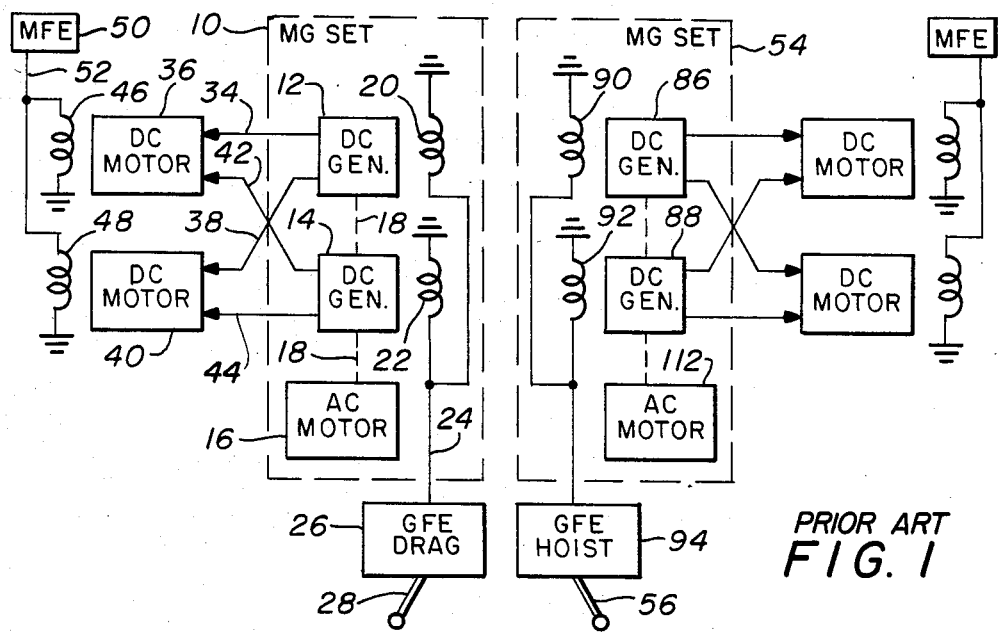
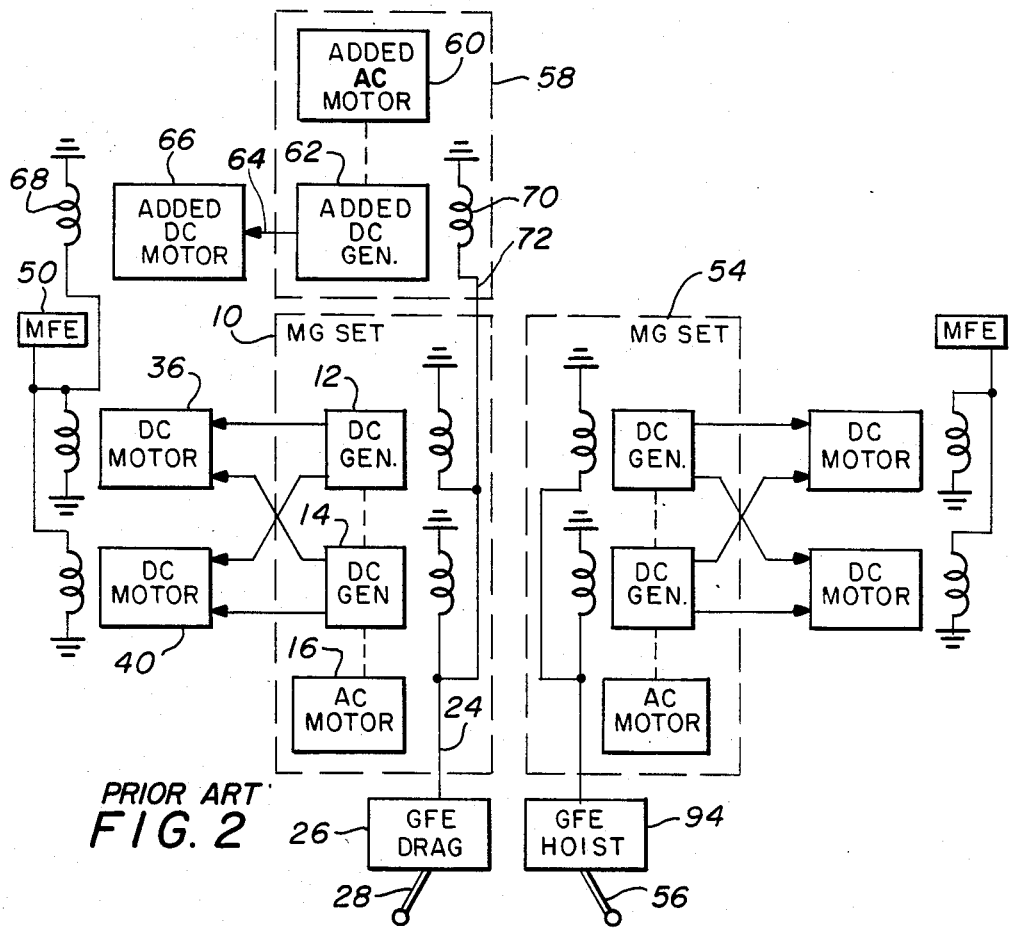
PRIOR ART
FIG. 1
PRIOR ART
FIG. 2

METHOD AND APPARATUS FOR ADDING ADDITIONAL D.C. MOTORS AND CONTROL THEREOF

BACKGROUND OF THE INVENTION

The present invention relates to a control system for a material handling device and more particularly to a control system of the type in which additional power required for a first motion, such as hoisting, may be obtained from the power source for a second motion such as drag and conversely additional power for the second motion may be obtained from the power available for the first motion under specified conditions.

Material handling apparatus, for example, a drag line, have a material handling device such as a bucket or scoop suspended from an inclined boom by means of a first cable. In such case, the bucket is designed such that when it is pulled toward the base of the boom by a second cable, it will scrape soil or other material from the surface being excavated. The first and second cables are normally wound upon motor driven reels such that rotation of the respective reels in one direction or the other will determine the position of the bucket and its direction of movement. Completely independent hoist and drag machinery is used for these operations including the electrical system. In addition, a third motion, such as swing, may be used to rotate the upper portion of the apparatus with respect to its base. This motion also requires separate machinery. Thus, at least one driving motor is used for each motion of the material handling device such as the bucket of a dragline excavator. For instance, one or more electric motors are used to hoist the bucket and one or more separate electric motors are used to drag the bucket in a horizontal plane and one or more separate electric motors are used to rotate the upper portion of the apparatus. For each driving motor a separate generator is used and the generators are driven by one or more AC motors. No attempt is made to switch the generators from one motion motor to another motion motor. This is done because the current flow interruption through existing electrical knife blades, contacters and the like would cause tremendous arcing problems.

However, once the material handling apparatus or device is constructed, it is almost impossible to add an additional motor to add greater power in one or more of the motions because there must also be added to the system an additional generator and an AC motor to drive the generator. Even if space were available to add the extra DC motor, the DC generator and the AC motor to drive the generator, the approach would be very expensive.

The present invention relates to an electronic switching system which automatically diverts the power output from one DC generator powering a DC motor for one motion to drive a supplementary DC motor used in powering the other motion. For simplicity in explanation, drag and hoist motions will be discussed but it should be understood that the novel invention can be used with other motions such as crawl, swing, and the like. If it is recognized that during a first motion, the power in a second motion is very low, the availability of using a generator from the second motion to drive a motor for the first motion is present by using one of the second motion generators. The generator is switched to the other motion only when the power requirement for the former motion is at a minimum. As an example only, drag motion power requirement is at a minimum during the hoisting motion. A DC generator output used to drive the drag motion DC motor is switched electronically by the present invention to drive a supplementary hoisting motion DC motor. The switching process is accomplished by utilizing switches such as silicon controlled rectifiers which can handle the output current of the generator.

Thus, it is recognized that the duty cycle of each motion is not the same and that a generator can be "borrowed" from one motion to drive an added motor necessary to assist in the other motion.

It is therefore an object of the present invention to "borrow" additional power from an existing generator powering a motor controlling a first motion to drive an added motor assisting the motors controlling a second motion.

It is also an object of the present invention to provide power for additional DC motors without adding additional DC generators and additional AC motors.

It is still another object of the present invention to utilize the existing DC generators in providing power for a first motion to be switched to an additional DC motor for a second motion when the duty cycle of the first motion is low.

SUMMARY OF THE INVENTION

Thus, the present invention relates to apparatus for controlling electrical power for causing at least first and second motions of a material handling device comprising means for detecting when a first one of the motions is requiring no more than a predetermined minimum amount of available electrical power, and means for coupling the balance of said available electrical power for said first motion to apparatus causing said second motion thereby increasing the electrical power available for said second motion without adding additional power sources.

The invention also relates to a method of controlling electrical power to apparatus causing first and second motions of a material handling device comprising the steps of detecting when a first one of said motions is requiring no more than a predetermined minimum amount of available electrical power, and coupling the balance of said available electrical power for said first motion causing apparatus to said second motion causing apparatus thereby increasing the electrical power available for said second motion without adding additional power sources.

BRIEF DESCRIPTION OF THE DRAWINGS

These and other objects of the present invention will be disclosed in conjunction with the accompanying drawings in which like numerals represent like components and in which:

FIG. 1 is a schematic diagram representing the prior art arrangement by which first and second motions of a material handling device are controlled with motor generator sets;

FIG. 2 represents the prior art method of adding an additional motor generator set driving an added electrical motor for one of the motions to increase the power thereto;

FIG. 5 is a schematic representation of a silicon controlled rectifier switch which can be used for the switches of the master control shown in FIG. 4.

DETAILED DESCRIPTION OF THE DRAWINGS

Figure 3:
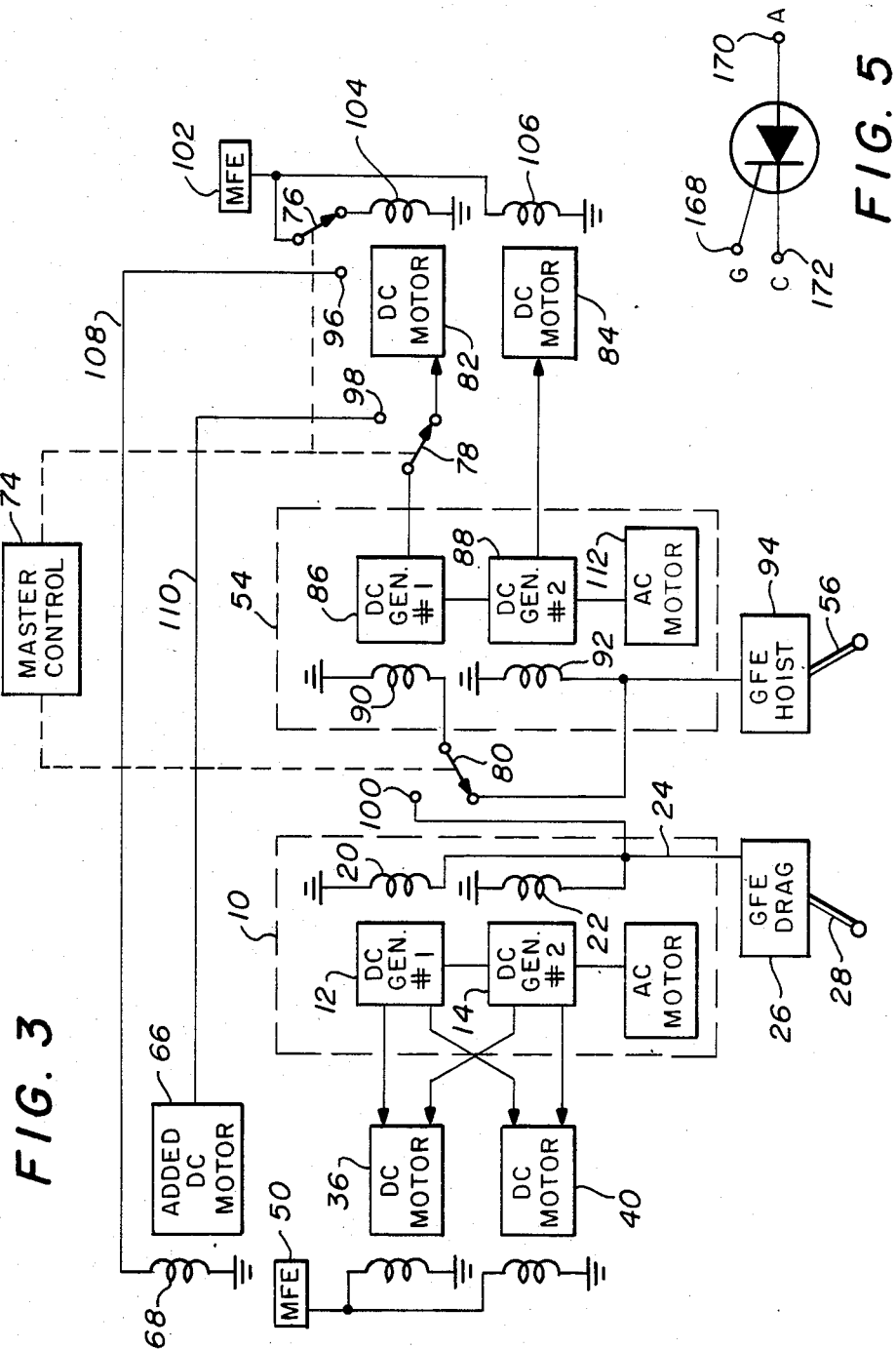
FIG. 3 is a schematic diagram of the present invention illustrating how the power from a first one of the motions can be transferred to an additional DC motor to assist a second motion when the power required by the first motion is at or below a predetermined minimum amount of power.

While for purposes of simplicity the present invention will be described hereafter in relation to the drag and hoist motions of a material handling device such as a drag line, it is to be understood that the motions involved may be swing, drag, hoist or any other particular motion suited for a particular apparatus including, for instance, power to move the machine from one place to the other. Thus, wherever the use of "drag" and "hoist" are used, it will be understood that they can be interchanged with "swing", "crawl" and the like.

FIG. 1 illustrates in block diagram form the apparatus for controlling two motions of a material handling apparatus such as drag and hoist. Thus, the hoist motion may be controlled by a motor generator set 10 which has DC generators 12 and 14 being driven by an AC motor 16 through a common shaft 18. DC generator 12 has a field excitation winding 20 and generator 14 has a field excitation winding 22. These windings are coupled through conductor 24 to a generator field excitation unit 26 which may be any well known type of device for varying the current through the field excitation coils or windings 20 and 22 thereby controlling the current output of DC generators 12 and 14. The operator generally has some type of a lever control 28 which is coupled to excitation unit 26 in a manner well known in the art to cause the field excitation unit 26 to vary the current through field excitation coils 20 and 22.

The output of DC generator 12 is coupled on line 34 to DC drive motor 36 and is coupled in parallel on line 38 to DC drive motor 40. In like manner, DC generator 14 has an output on line 42 that is coupled to DC drive motor 36 and an output on line 44 to DC drive motor 40. DC drive motor 36 has its own field excitation coil 46 while DC drive motor 40 has its own field excitation coil 48. Both field excitation coils 46 and 48 receive current from a motor field excitation source 50 on line 52 in a manner well known in the art.

Thus, the operator by controlling lever 28, varies the current through field excitation coils 20 and 22 of DC generators 12 and 14 thereby varying the output current to DC drive motors 36 and 40 which are coupled to a common shaft to provide power to operate a first motion of the equipment such as hoist motion. The other motor generator set 54 operates in a similar manner to control another motion such as drag. It will be noted that the two motions are separately controlled by the operator through controls 28 and 56.

Once the material handling apparatus, such as a drag line, has been built, it is possible to add power to one motion or the other only by adding an additional motor generator set such as that shown in FIG. 2 by the numeral 58. As can be seen in FIG. 2, the additional motor generator set 58 includes an additional AC motor 60 driving an added DC generator 62 which produces an output on line 64 to additional DC drive motor 66.

Again, DC drive motor 66 has its own field excitation coil 68 which, of course, could be coupled to current source 50 which drives the excitation coils for the other DC drive motors 36 and 40. Also, the additional DC generator 62 has its own field excitation coil 70 which can be coupled through line 72 to the current source 26 which is varied by the operators control 28.

Of course, if additional power needs to be added to the other motion, then the equivalent additional motor generator set 58 and added DC motor 66 would have to be added to the motor generator set 54 shown in FIG. 2. The disadvantage of such prior art system is obvious. In the first place it would be extremely difficult to find the additional space necessary for the added motor generator set 58. It would be even more difficult to provide added space for another motor generator set such as 58 to add power to the other motion. In addition, of course, it would be very expensive to add even one additional motor generator set 58 for either motion. Even when these difficulties are overcome, the inability to make the added motor perform in electrical harmony with the existing DC motors is still prevalent.

FIG. 3 is a block diagram representing the unique invention disclosed herein which allows additional power to be supplied to a first motion from the DC generators for another motion at the times when the other motion is requiring power below a predetermined minimum amount. For instance, in a drag line, very little drag power is used during hoisting operations. Assume, in FIG. 3, that DC drive motors 36 and 40 are used for the hoist operation and DC drive motors 82 and 84 are used for drag operations. A master control 74 can be utilized to sense the power requirements of DC drive motors 82 and 84 and when that power is at a minimum, as for instance during a hoisting operation, master control 74 causes the output of DC generator 86 to be coupled to added DC drive motor 66 to provide additional power for the hoist operation.

During normal operations, the operator controls the drag operation through control stick or lever 56 which causes field excitation unit 94 to vary the current through field excitation coils 90 and 92 for DC generators 86 and 88 in motor generator set 54 thereby varying the power output of generators 86 and 88 to DC drive motors 82 and 84 respectively. In like manner, the hoist operation is controlled by the operator through control stick 28 which as described previously causes field excitation unit 26 to vary the field current through field excitation coils 20 and 22 of DC generators 12 and 14 of motor generator set 10 thus controlling the hoist motion.

If an exceptionally heavy hoist load is encountered, master control 74 will sense the power requirements of the drag drive motors 82 and 84. If they are below a predetermined minimum, master control 74 causes switches 76, 78 and 80 to move from the positions shown to a second position indicated by contacts 96, 98 and 100 respectively.

Switch 76 causes the motor field excitation source 102 to couple its output through contact 96 on line 108 to field excitation coil 68 of added DC drive motor 66 and removes its output from field excitation coil 104 of DC motor 82. Switch 78 removes the output of DC generator 86 from DC drive motor 82 and couples it to added DC drive motor 66 on line 110 through contact 98. Switch 80 removes the control of field excitation coil 90 of DC generator 86 from the drag control 56 and couples it to contact 100 which places the field excitation coil 90 under the control of the hoist control 28. Thus, as more power is required by the operator through control lever 28, greater amounts of current are generated by device 26 and coupled through field excitation coils 20, 22 and 90 of DC generators 12, 14, and 86 respectively. Thus, the output of DC generator 86 is now driving added DC drive motor 66 and is being controlled by the hoist control 28 rather than drag control 56. It will be noted that there is still additional drag control available by means of control lever 56 varying the current through device 94 to the field excitation coil 92 of DC generator 88. Thus, the output of DC generator 88 to DC drive motor 84 can still be controlled thereby allowing control of the drag operation up to some preset minimum. That minimum, of course, is the power available from DC motor 84 as it is powered by DC generator 88.

Further, while applicant has disclosed only the addition of the DC drive motor 66 on the hoist side in FIG. 3, it will be seen that an identical circuit could be shown to add a DC drive motor to the drag side of FIG. 3 as necessary. Only one added drive motor 66 has been shown for simplicity of the drawings.

Figure 4:
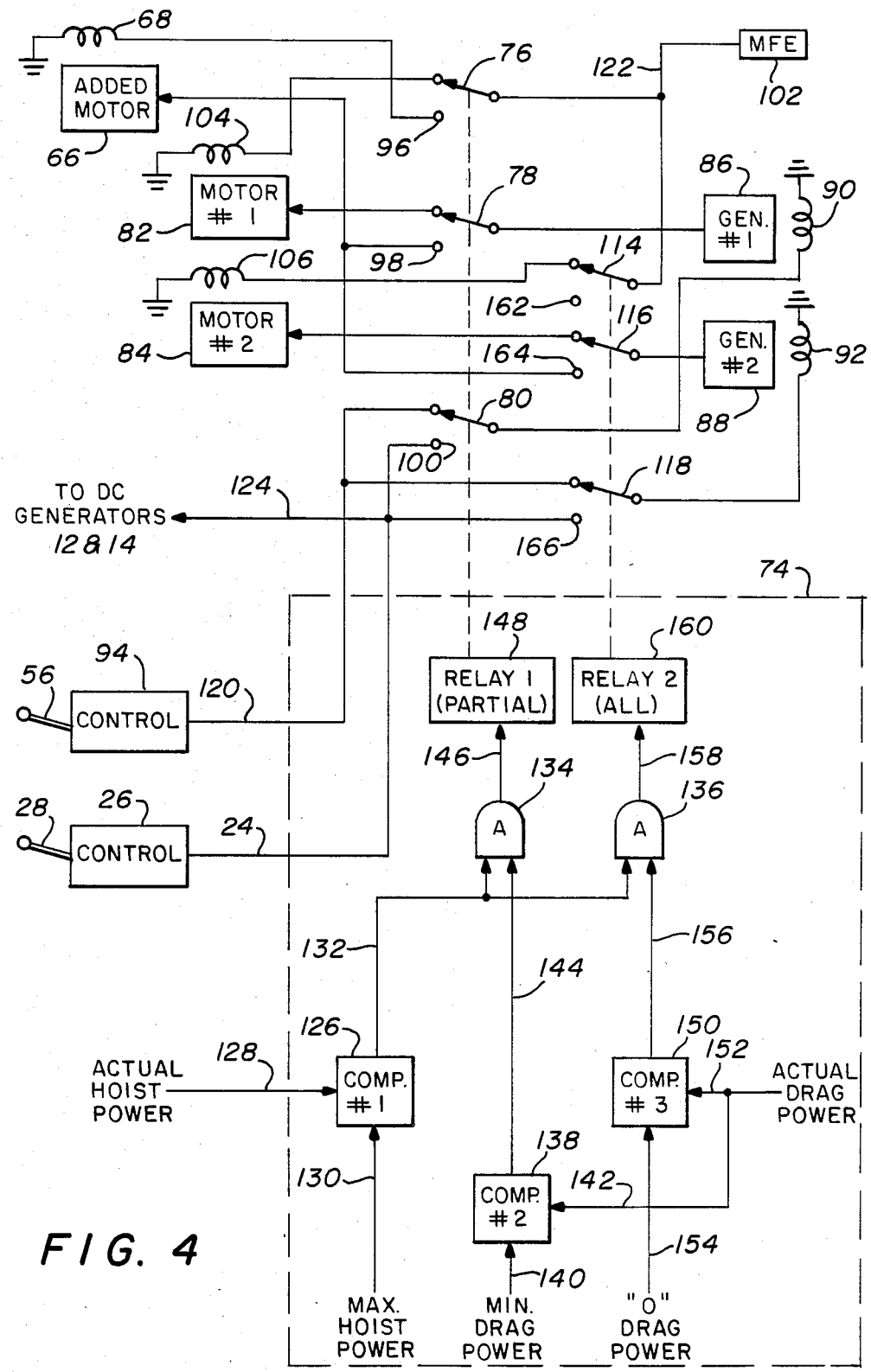
FIG. 4 is a schematic representation of the master control illustrated in FIG. 3 which transfers the power from the generator or generators of a first one of the motions to the additional DC motor to assist a second one of the motions.

The detailed circuit operation of master control 74 is illustrated in FIG. 4. Thus, under normal operations as shown in FIG. 4, motor field excitation source 102 provides an output on line 122 through moveable switch 76 and field excitation coil 104 of first drag drive motor 82 as well as through switch contact 114 to field excitation coil 106 of a second drag drive motor 84.

In like manner, the output of generator 86 is coupled through switch contact 78 to first drag drive motor 82. Also, the output of generator 88 is coupled through switch contact 116 to the second DC drag motor 84. The hoist operation is controlled by the operator through stick or lever control device 28 which causes current control device 26 to produce an output on line 24 which is coupled on conductor 124 to the field current excitors 20 and 22 of DC hoist generators 12 and 14 shown in FIG. 3. In like manner, the drag is controlled by the operator through stick or lever control 56 which causes circuit 94 to vary the output current on line 120 which is coupled through switch 80 to field excitation coil 90 of generator 86 and through switch 118 to field excitation coil 92 of generator 88. Thus, both hoist and drag operations are controlled by the operator.

Assume that as the operator begins to increase the use of hoist power he begins to decrease the use of drag power. Comparator 126 compares the actual hoist power, $P_{1A}$ being utilized as represented by a signal on line 128 with the maximum hoist power, $P_{MAX}$ available represented by a signal on line 130. When the actual hoist power equals the maximum available hoist power, comparator 126 produces an output on line 132 which is coupled as one input to AND gate 134 and AND gate 136.

A second comparator 138 has as an input a signal on line 140 representing a predetermined minimum drag power, $P_{MIN}$, which is needed to be maintained, and as a second input a signal on line 142 representing the actual drag power, $P_{2A}$, being utilized by the drag drive motors 82 and 84. If the actual power being utilized by the drag drive motors 82 and 84 is less than the predetermined minimum on line 140, comparator 138 produces an output on line 144 which is coupled as a second input to AND gate 134. AND gate 134 is now energized and produces an output on line 146 which activates a device represented by relay 148 thus causing switches 76, 78 and 80 to change from the positions shown to contact points 96, 98 and 100 respectively.

As will be seen, this operation causes the output of motor field excitor 102 to be removed from field excitation coil 104 of drag drive motor 82 and is coupled through switch 76 and contact 96 to the field excitation coil 68 of the added drive motor 66. In addition it removes the output of generator 86 from drag drive motor 82 and couples it through switch 78 and contact 98 to added DC drive motor 66. Finally, it causes the field excitation coil 90 of generator 86 to be removed from the drag control lever 56 and couples coil 90 through switch 80 and contact 100 to the field current control circuit 26 which is controlled by hoist lever 28. Thus, generator 86 is now being used and controlled by the hoist lever 28 to cause added hoist power through added DC drive motor 66. It will be noted at this time that the drag generator 88 is still providing power through switch contact 116 to drag drive motor 84 and control lever 56 is still controlling drag motion through generator 88 by varying the current through field excitation coil 92 through switch contact 118, line 120 and current control unit 94. Thus, both hoist and drag control are maintained except that a portion of the drag power has now been applied or added to the hoist motion.

There are many ways well known in the art to determine actual power being utilized by the motion motors such as current, torque and the like and will not be described in detail here. Suffice it to say that any well known method may be used to determine the signal on lines 128, 142 and 152.

There are situations in which one of the motions will be entirely unused during some particular interval of time. It is possible, for instance, that during hoist operations that no drag motion will be required at all. In addition, swing motion may be utilized with neither hoist nor drag motions. Also, crawling motion of the apparatus may be utilized to move it from one place to the other without utilizing hoist, swing or drag. In such instances, all of the power from the unused motion could be transferred to another motion instead of just some of the power as described previously.

Consider, in FIG. 4, comparator 150 which has an input on line 152 representing the actual power, $P_{2A}$, from one motion, such as drag, while the input on line 154 is a signal representing zero use of drag power. If the actual power usage is zero, comparator 150 will produce an output on line 156 which provides the second enable to AND gate 136 causing it to produce an output on line 158 which enables a device represented by relay 160. Relay 160 causes switches 114, 116, and 118 to change from the positions shown to connect to contacts 162, 164 and 166 respectively.

In this case, the output of motor field excitation unit 102 is also removed from field excitation coil 106 of second drag drive motor 84 and simply connected to a contact 162 which has no circuit attached thereto. Likewise, switch contact 116 moves to point 164 to disconnect the output of generator 88 from second drag drive motor 84 and couple it to added DC drive motor 66. Finally, switch 118 moves to contact 116 thus causnng field excitation coil 92 of generator 88 to be removed from the control of lever 56 and place it under the control of the hoist lever 28 and field current unit 26 which produces the output on line 24. Thus, all of the DC generators have been disconnected from the control of drag lever 56 and its generator field current producing unit 94 and have been coupled to the control of the hoist lever 28. Thus, all power has been coupled from one motion to the other motion.

Obviously, where large currents are utilized, it is impractical to use knife blades or relays for switches 76, 78, 80, 114, 116 and 118. In such case, a silicon controlled rectifier such as shown in FIG. 5 can be utilized as the necessary switches. These devices are three junction, three terminal thyristors that are normally an open circuit in both directions. When the proper signal is applied to the gate electrode 168, the device rapidly switches to a conducting state and allows current flow in the forward direction as in a conventional rectifier from the anode 170 to the cathode 172. It remains turned on when the gate voltage is removed and it can be turned off by removing the anode voltage, reducing the anode voltage below cathode voltage, or making the anode voltage negative as on alternate half cycles of an AC circuit. These devices can handle heavy currents without any problem and can be coupled in a well known manner to take the place of the switches indicated. It is also understood, of course, that instead of utilizing the comparators and AND gates 134 and 136, the relays 148 and 160 or their corresponding silicon controlled rectifiers could be actuated by a manual switch where currents allow it. Thus, if the operator decides that he needs more power on hoist than he is requiring on drag, he could simply throw a switch represented by relay 148 which would control switch contacts 176, 178 and 180 as indicated previously to transfer partial power from one motion to another. In addition, he could throw a second switch represented by relay 160 to control contacts 114, 116, and 118 thus diverting all of the power to the other motion. By utilizing the master control circuit 74 as shown in FIG. 4, however, the power will automatically switch when predetermined minimums and maximums are reached.

Thus, there has been disclosed a unique invention which includes an electronic switching system for automatically diverting the power output from one DC generator in a first motion system to drive a supplementary DC motor used in powering a second motion system. The generator is switched to the second motion only when the power requirement for the first motion is at some predetermined minimum. As an example, drag motion power requirement is at a minimum during the hoisting motion. A DC generator output that is used to drive a drag motion DC drive motor can be switched electronically to drive a supplementary hoisting motion DC drive motor. The switching process is accomplished by existing electronic systems and could include silicon controlled rectifiers.

Further, as indicated previously, while only two motors and generators are illustrated in each motor generator set, it is obvious that two, four, six, eight, ten or more generators and corresponding motors could be utilized. Switching could then take place at any desired level leaving one or more motors to power a first motion while diverting the other generators of the first motion to the second motion.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

I claim:

1. In apparatus having a material handling device moveable in at least first and second motions and having a first motor generator set for providing electrical power to cause said at least first motion, a second motor generator set for providing electrical power to cause said at least second motion, each of said motors and generators having field excitation windings provided with electrical current, and a first and a second motion control means coupled to respective generator field excitation windings for varying the current therethrough to control the power to said respective first and second motions, the improvement comprising:
    a. a standby electrical drive motor on said apparatus for providing additional power for said first motion, and
    b. means coupled to said first and second motion control means and said second motor generator set for selectively coupling either all or only a portion of said electrical power from said second motor generator set to said standby electrical drive motor thereby increasing the power to said first motion and decreasing the power to said second motion.

2. Apparatus as in claim 1 wherein said second motor generator set for providing power for said second motion comprises:
    a. generator one driving motor one, and
    b. at least generator two driving motor two, said motor one and motor two providing combined power for said second motion.

3. Apparatus as in claim 2 wherein said selective coupling means includes:
    a. a first switch having a first position for coupling the output of generator one only to motor one and a second position for coupling the output of generator one only to said standby electrical motor,
    b. a second switch having a first position for coupling current to only the field excitation windings of said motor one and a second position for coupling current to only the field excitation windings of said standby motor, and
    c. a third switch having a first position coupling the field excitation windings of said generator one only to said second motion control means and a second position coupling the field excitation windings of said generator one only to said first motion control means whereby said second motion control means varies the power from generator one to said motor one when said first, second and third switches are in said first position and said first motion control means varies the power from generator one to said standby motor when said first, second and third switches are in said second position.

4. Apparatus as in claim 3 wherein said first, second and third switches are combined in a triple pole, double throw switch, manually controlled between said first and second positions by an operator of said apparatus whereby in said first position of said switch all of said power from said second motor generator set is used for said second motion and is varied by said second motion control means and in said second position of said switch at least the power from generator one is removed from motor one and coupled to said standby motor and varied by said first motion control means thereby decreasing the power available to said second motion and increasing the power to said first motion.

5. Apparatus as in claim 3 wherein said first, second and third switches comprise:

a. a relay having first, second and third pairs of contacts moveable between said first and second positions, b. a coil coupled to said contacts for moving said contacts from said first position to said second position when said coil is energized, and c. means for selectively generating a signal to energize said relay coil whereby in said first position of said relay all of said power from said second motor generator set is used for said second motion and is varied by said second motion control means and in said second position of said relay at least the power from generator one is removed from motor one and coupled to said standby motor and varied by said first motion control means thereby decreasing the power available to said second motion and increasing the power to said first motion.

6. Apparatus as in claim 3 wherein said first, second and third switches comprise:

a. solid state switches which conduct a current only in a first state and prevent current flow in a second state, and b. means for selectively generating a signal to energize said solid state switches whereby in said first state of said switches, all of said power from said second motor generator set is used for said second motion and is varied by said second motion control means and in said second state of said switches at least the power from generator one is removed from motor one and coupled to said standby motor and varied by said first motion control means thereby decreasing the power available to said second motion and increasing the power to said first motion.

7. Apparatus as in claim 5 or 6 wherein said selective signal generating means comprises:

a. means for establishing a signal, $P_{MAX}$, representing a predetermined maximum output power produced by said first motor generator set, b. a first comparator coupled to said first motor generator set for comparing actual output power, $P_{1A}$, with said signal representing said established predetermined maximum power, $P_{MAX}$, and generating a first output signal only when $P_{1A}=P_{MAX}$, c means for establishing a signal, $P_{MIN}$, representing a predetermined minimum output power produced by said second motor generator set, d. a second comparator coupled to said second motor generator set for comparing actual output power, $P_{2A}$, with said signal representing said established predetermined minimum output power, $P_{MIN}$, and generating a second output signal only when $P_{2A}<P_{MIN}$, and e. an AND gate having its input coupled to said first and second comparators and its output generating said selective energizing signal whereby when said first motor generator set is operating at said predetermined maximum power, $P_{MAX}$, and said second motor generator set is operating below said predetermined minimum power, $P_{MIN}$, power is automatically transferred from said second motor generator set to said standby motor.

8. In a control system for material handling apparatus in which a material handling device attached thereto is controlled in at least first and second motions by operating first and second motors driven by first and second generators respectively, the improvement comprising:

a. first means for detecting when the first motion requires more power from said first motors than maximum power available from said first generators, b. second means for detecting when the second motion is requiring less power from said second motors than some predetermined minimum power available from said second generators, c. a supplemental motor for providing additional power for said first motors as needed, and d. means coupled to said first and second detecting means, said second generators and said supplemental motor, for coupling at least a portion of said power from said second generators to said supplemental motor to increase power available to said first motion and decrease power available to said second motion when power requirements for said second motion are below said predetermined minimum power and power requirements for said first motion exceed said maximum power available from said first generators.

9. Apparatus for controlling electrical power generators and motors for each of at least first and second motions of a material handling device comprising:

a. means coupled to one of said generators for detecting when one of said motions is requiring no more than a predetermined minimum amount of available electrical power, and b. means coupled to said detecting means and said motor for said other motion for utilizing the balance of said available electrical power of said one generator for said one motion to increase the electrical power available to said motor for said other motion thereby increasing the electrical power available for said other motion without adding additional power sources.

10. In a method of controlling at least first and second motions of a material handling device, providing electrical power with a first motor generator set to cause said at least first motion, providing electrical power with a second motor generator set to cause said at least second motion, providing field excitation windings on each of said motors and generators with electrical current, and coupling a first and a second motion control means to respective generator field excitation windings for varying the current therethrough to control the power to said respective first and second motions, the improvement comprising the steps of:

a. providing a standby electrical drive motor to produce additional power for said first motion, and b. selectively coupling either all or only a portion of said electric power from said second motor generator set to said standby electrical drive motor thereby increasing the power available to said first motion and decreasing the power to said second motion.

11. A method as in claim 10 wherein said step of providing power for said second motion comprises the steps of:

a. driving a first motor with a first generator, and b. driving at least a second motor with at least a second generator, said first motor and said second motor providing combined power for said second motion.

12. A method as in claim 11 wherein said selective coupling step further comprises the steps of:

a. providing a first switch having a first position for coupling the output of said first generator only to said first motor and a second position for coupling the output of said first generator only to said standby electrical drive motor, b. providing a second switch having a first position for coupling current to only the field excitation windings of said first motor and a second position for coupling current to only the field excitation windings of said standby motor, and c. providing a third switch having a first position coupling the field excitation windings of said first generator only to said second motion control means and a second position coupling the field excitation winding of said first generator only to said first motion control means whereby said second motion control means varies the power from said first generator to said first motor when said first, second and third switches are in said first position and said first motion control means varies the power from said first generator to said standby motor when said first, second and third switches are in said second position.

13. A method as in claim 12 wherein said first, second and third switches form a triple pole, double throw switch manually controlled between said first and second positions by an operator of said material handling device whereby in said first position of said switch all of said power from said second motor generator set is used for said second motion and is varied by said second motion control means and in said second position of said switch at least the power from said first generator is removed from said first motor and coupled to said standby motor and varied by said first motion control means thereby decreasing the power available to said second motion and increasing the power to said first motion.

14. A method as in claim 12 wherein the steps of providing said first, second and third switches comprise the steps of:

a. providing a relay having first, second and third pairs of contacts moveable between said first and second positions, b. coupling a relay coil to said contacts for moving said contacts from said first position to said second position when said relay coil is energized, and c. selectively generating a signal to energize said relay coil whereby in said first position of said relay all of said power from said second motor generator set is used for said second motion and is varied by said second motion control means and in said second position of said relay the power from said first generator is removed from said first motor and coupled to said standby motor and varied by said first motion control means thereby decreasing the power available to said second motion and increasing the power to said first motion.

15. A method as in claim 12 wherein the step of providing said first, second and third switches comprises the steps of:

a. utilizing solid state switches which conduct current only in a first state and prevent current flow in a second state, and b. selectively generating a signal to energize said solid state switches whereby in said first state of said switches all of said power from said second motor generator set is used for said second motion and is varied by said second motion control means and in said second state of said switches at least the power from said first generator is removed from said first motor and coupled to said standby motor and varied by said first motion control means thereby decreasing the power available to said second motion and increasing the power to said first motion.

16. The method of claim 14 or 15 wherein the step of selectively generating said signal comprises the steps of:

a. establishing a signal $P_{MAX}$, representing a predetermined maximum output power produced by said first motor generator set, b. coupling a first comparator to said first motor generator set for comparing actual output power, $P_{1A}$, with said signal representing said established predetermined maximum power, $P_{MAX}$, and generating a first output signal only when $P_{1A} = P_{MAX}$, c. establishing a signal, $P_{MIN}$, representing a predetermined minimum output power produced by said second motor generator set, d. coupling a second comparator to said second motor generator set for comparing its actual output power, $P_{2A}$, with said signal representing said established predetermined minimum output power, $P_{MIN}$, and generating a second output signal only when $P_{2A} < P_{MIN}$, and e. coupling the input of an AND gate to said first and second comparators for generating said selective energizing signal at its output whereby when said first motor generator set is operating at said predetermined maximum power and said second motor generator set is operating below said predetermined minimum power, power is automatically transferred from said second motor generator set to said standby motor.

17. An improved method of controlling a material handling apparatus in which a material handling device attached thereto is controlled in first and second motions by operating first and second motors driven by first and second generators respectively, the improved method comprising the steps of:

a. detecting when the first motion requires more power from said first motors than maximum power available from said first generators, b. detecting when the second motion is requiring less power from said second motors than some predetermined minimum power available from said second generators, c. adding a supplemental motor for providing additional power for said first motors as needed, and d. coupling only a portion of said power from said second generators to said supplemental motor to increase power available to said first motion and decrease power available to said second motion when said detected power requirements for said second motion are below said predetermined minimum power and said detected power requirements for said first motion exceed said maximum power available from said first generators.

18. A method of controlling electrical power to apparatus causing first and second motions of a material handling device comprising the steps of:

a. detecting when one of said motion causing apparatus is requiring no more than a predetermined minimum amount of available electrical power, and b. utilizing the balance of said electrical power available for said one motion causing apparatus to increase the electrical power available to said other motion causing apparatus thereby increasing the electrical power available for said other motion without adding additional power sources.

* * * * *